Sept. 13, 1927.  F. H. WINSLOW ET AL  1,642,569
HAND TOOL
Filed May 3, 1926   2 Sheets-Sheet 1
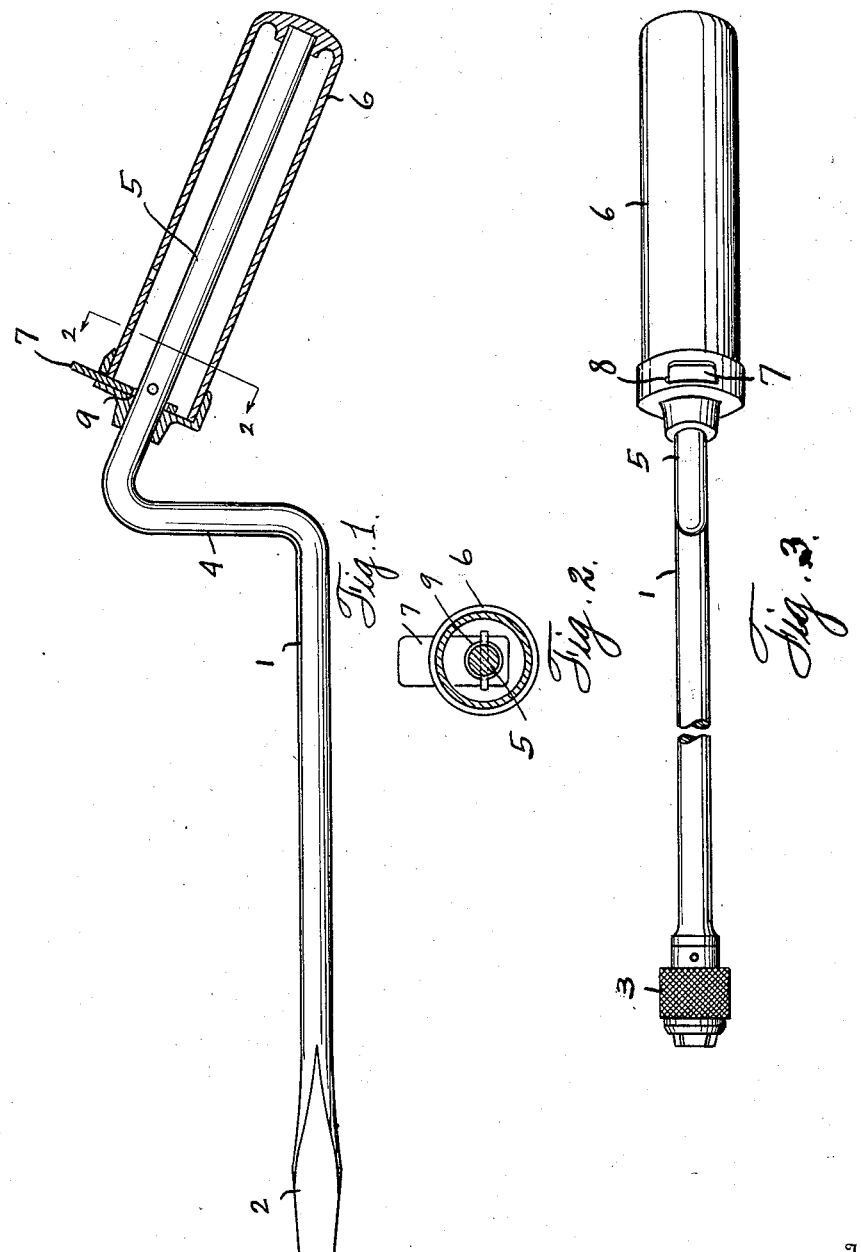
Inventors
Frederick H. Winslow
Bose Reader
By Hardway Cathy
Attorneys Sept. 13, 1927.  1,642,569

F. H. WINSLOW ET AL

HAND TOOL

Filed May 3, 1926   2 Sheets-Sheet 2.

Inventors
Frederick H. Winslow
Bose Reader

By
Hardway Cather
Attorneys

Patented Sept. 13, 1927.

1,642,569

UNITED STATES PATENT OFFICE.

FREDERICK H. WINSLOW AND BOSE READER, OF ALEDO, TEXAS.

HAND TOOL.

Application filed May 3, 1926. Serial No. 106,253.

This invention relates to new and useful improvements in a hand tool.

One object of the invention is to provide a hand tool specially designed for driving screw drivers, bits, reamers and the like, and having a novelly arranged grip member whereby the tool may be driven.

Another object of the invention is to provide a tool of the character described equipped with a novelly arranged grip member whereby the tool may be rapidly rotated and great power applied to the work.

With the above and other objects in view this invention has particular relation to certain novel features of construction, operation and arrangement of parts an example of which is given in this specification and illustrated in the accompanying drawings, wherein:—

Figure 1 shows a side elevation, partly in section, of one form of the device.

Figure 2 shows a cross sectional view thereof, taken on the line 2—2 of Figure 1.

Figure 3 shows a side view of the implement of the general type shown in Figure 1, but having its shank equipped with a chuck for holding bits of various kinds.

Figure 4:
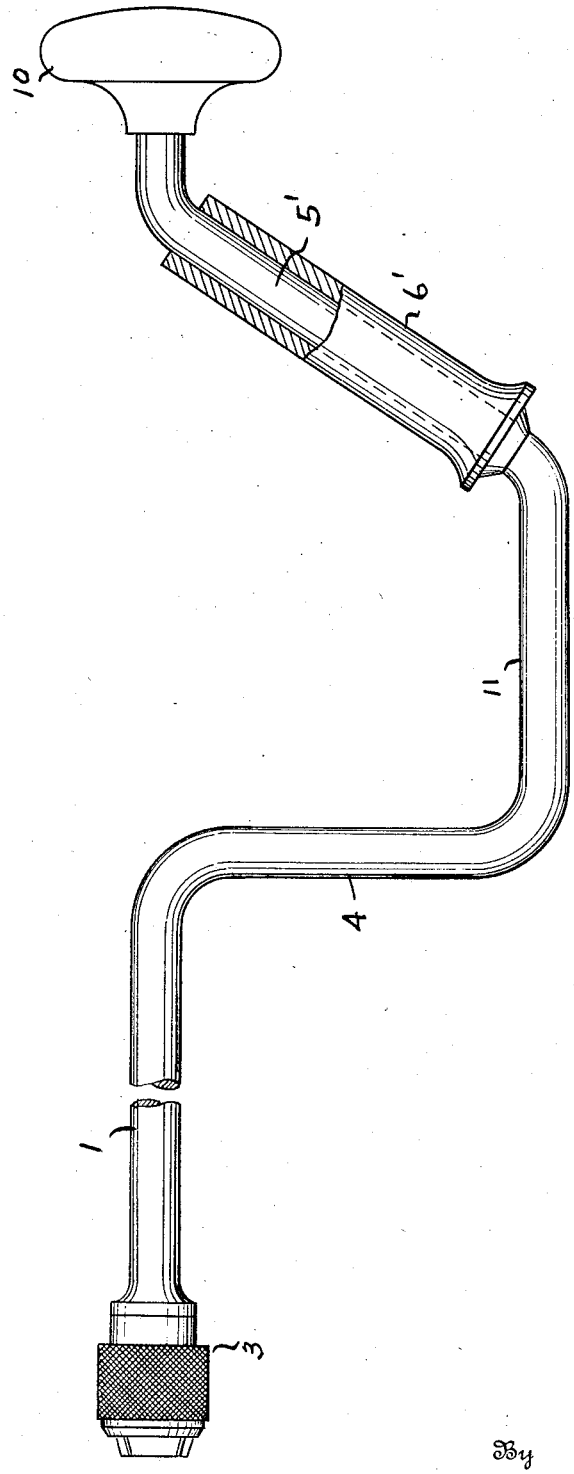
Figure 4 shows a side view partly in section, of another type of tool.

Referring now more particularly to the drawings, wherein like numerals of reference designate similar parts in each of the figures the numeral 1 designates the shank of the tool. As shown in Figure 1 this shank terminates in a screw driver 2 which is integral therewith.

In Figure 3 the shank is shown as equipped with a chuck 4 to receive any type of bit, reamer or other tool in the usual way.

The other end of the shank has an offset portion 4 forming a crank, and a handle portion 5 which is inclined with relation to the axial line of the shank.

There is a grip member 6, rotatably mounted on the handle, for ease in operation.

The angle of the handle 5, relative to the shank 1, is such that when the tool is rotated the axial line of the handle will describe the surface of a cone, with its apex on the axial line of the shank.

When the tool is applied to the work, as for example a screw, the handle may then be swung around the axis of the shank and the screw rapidly driven home or unscrewed.

Great power may be applied to the work on account of the leverage secured, through the crank 4. In applying the tool to the work it is often desirable to hold it rigid with respect to the grip 6 and for this purpose there is a pressure plate 7 which works through a slot 8 in the grip and whose inner end has a bearing 9 through which the handle 5 works. By applying pressure to the outer end of the plate 7 the friction of said plate with the handle 5 will hold the operative end of the tool steady until it is engaged with the work. The friction plate 7 may then be released and the handle swung around its axis describing the surface of a cone, until the desired work is accomplished.

In the form shown in Figure 4 the free end of the handle 5' is turned into alignment with the shank 1 and provided with a butt 10 and there is a grip portion 11, parallel with the axis of rotation of the shank 1, and located between the crank portion 4 and the handle 5. This type of the tool is adapted for use where great force is required, as for example in loosening nuts preparatory to unscrewing them, or in screwing nuts or bolts securely home, or for similar work. In such case the butt 10 may be held in one hand, or against the body of the workman, and the grip portion 11 grasped by the other hand and the screw, nut, bolt, or the like, loosened or securely driven home, and the remainder of the work of unscrewing, or screwing up said nut, or the like, quickly accomplished by grasping the grip 6', which is rotatable on the handle 5' and swinging the same around the axis of the shank, as hereinbefore described.

What we claim is:

1. A hand tool including a shank, a handle, one end of which is connected to but offset from said shank, a grip rotatable on the handle and a pressure plate carried by said tool and adapted to engage the handle to hold the same against rotation relative to the grip.

2. A hand tool including a shank, a handle, one end of which is connected to and offset from the shank, said handle converging toward the axial line of the shank, a rotatable grip member carried by said handle and a friction member associated with the grip member and adapted to frictionally engage the handle to hold it against rotation relative to said grip member.

In testimony whereof we have signed our names to this specification.

FREDERICK H. WINSLOW.
BOSE READER.